United States Patent [19]
Pierce

[11] Patent Number: 5,664,478
[45] Date of Patent: Sep. 9, 1997

[54] SPRING BRAKE ACTUATOR WITH CORROSION FUSES

[75] Inventor: William C. Pierce, Muskegon, Mich.

[73] Assignee: NAI Anchorlok, Inc., Muskegon, Mich.

[21] Appl. No.: 727,030

[22] Filed: Oct. 8, 1996

Related U.S. Application Data

[63] Continuation of PCT/US95/16635, Dec. 19, 1995.

[51] Int. Cl.$^6$ .................................................. F01B 25/26
[52] U.S. Cl. ........................... 92/5 R; 92/63; 92/130 A; 116/70; 116/208; 188/53
[58] Field of Search ..................... 92/63, 89, 130 A, 92/5 R; 116/208, 67 R, 70; 188/53 D; 91/1

[56] References Cited

U.S. PATENT DOCUMENTS

| | | | |
|---|---|---|---|
| 3,922,999 | 12/1975 | Meginnis | 116/70 |
| 4,338,097 | 7/1982 | Turner et al. | 116/208 |
| 4,571,994 | 2/1986 | Dickey et al. | 73/168 |
| 4,890,540 | 1/1990 | Mullins | 92/63 |

FOREIGN PATENT DOCUMENTS

WO 95/12748  5/1995  WIPO.

*Primary Examiner*—Thomas E. Denion
*Attorney, Agent, or Firm*—Varnum, Riddering, Schmidt & Howlett LLP

[57] ABSTRACT

A spring break actuator (10) with a cast aluminum adapter (74) partially defining tandem spring brake and service brake portions has several corrosion fuses on the adapter. Each corrosion fuse is defined by a recessed or thinned area which does not compromise the structural integrity of the adapter.

16 Claims, 3 Drawing Sheets

SPRING BRAKE ACTUATOR WITH CORROSION FUSES

BACKGROUND OF THE INVENTION

Related Applications

This application is a continuation of International Application No. PCT/US95/16635, filed Dec. 19, 1995.

Field of the Invention

The invention relates to air-operated brakes for vehicles and particularly to combination service and emergency brake actuator assemblies with metal housings.

State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and an emergency brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator and connected by an adapter, sometimes also known as a flange case. The adapter is usually formed of cast aluminum.

When full pressure is applied to the emergency brake actuator, air pressure acting against a movable member such as a piston or diaphragm compresses the spring. A spring brake actuator rod is held in a retracted position by a relatively small return spring, thus not affecting the operation of the brake. When the brake is to be applied during normal driving operation, compressed air is provided to the service brake actuator which, acting against a movable member such as a diaphragm, urges a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the emergency brake spring acting on the spring brake actuator rod which in turn acts upon the service brake push rod to apply the brakes. Thus, the spring brake portion serves both as a parking brake and an emergency brake.

U.S. Pat. No. 4,850,263 discloses a known spring brake assembly which includes both a spring brake portion and a service brake portion. The service brake portion includes an air chamber partially defined by a flexible diaphragm acting against a service brake push rod and a return spring to assure proper release of the brake when air is exhausted from the air chamber. The spring brake portion also includes an air chamber partially defined by a diaphragm acting against a spring pressure plate to compress the emergency brake spring when air pressure is supplied to the chamber. An actuating rod having one end engaging a surface of the diaphragm internal to the chamber is pushed outwardly from the chamber through a housing opening and bearing provided with a pneumatic seal to engage the diaphragm and push rod of the service brake and to cause the brake to be applied. The spring brake portion is provided with a return spring surrounding the spring brake actuator rod which forces the one end of the actuating rod against the diaphragm.

A problem that is common to all brake actuators is corrosion. The effects of corrosion are most commonly retarded by painting, powder coating, or otherwise protecting the exterior surfaces of the housings. Nevertheless, corrosion does occur, and often at different rates with differing effects depending upon materials and environment. For example, the service brake housing and the spring brake chamber are typically formed of steel shells which eventually succumb to the galvanic action of rust. The adapter housing, typically formed of aluminum, is subject to pitting caused in large part by road salt. This problem is particularly acute in those countries, such as Canada, where road salt is concentrated with calcium chloride.

SUMMARY OF THE INVENTION

The present invention relates to a brake actuator of the type having an adapter with a wall formed era material subject to corrosion. A typical brake actuator of this type includes a pressure chamber within the adapter, and a movable member within the adapter which moves in response to changes in normal pressure within the pressure chamber for actuation and release of a brake. According to the invention, the adapter has at least one corrosion fuse on its surface adjacent to the pressure chamber. The corrosion fuse comprises a depression in a surface of the wall wherein the wall is thinner at the depression than the surrounding area. The depression has a clearly defined area which is small enough so it does not compromise the ability of the wall to contain normal pressure within the pressure chamber. However, any corrosion occurring on the surface of the wall is likely to result in penetration of the wall at the depression before penetration of the surrounding areas of the wall. Any such penetration in the depression will result in a detectable leak within the area of the depression. However, because the depression does not compromise the structural integrity of the wall in supporting the housing, any such corrosion is unlikely to result in failure of the adapter.

Preferably, the depression is on an exterior surface of the wall and is formed with curved edges that avoid discontinuities in the surface of the wall.

Preferably, each depression will be circular in shape, and the total number of such depressions will be within a range of two to ten, inclusive.

DETAILED DESCRIPTION

Figure 1:
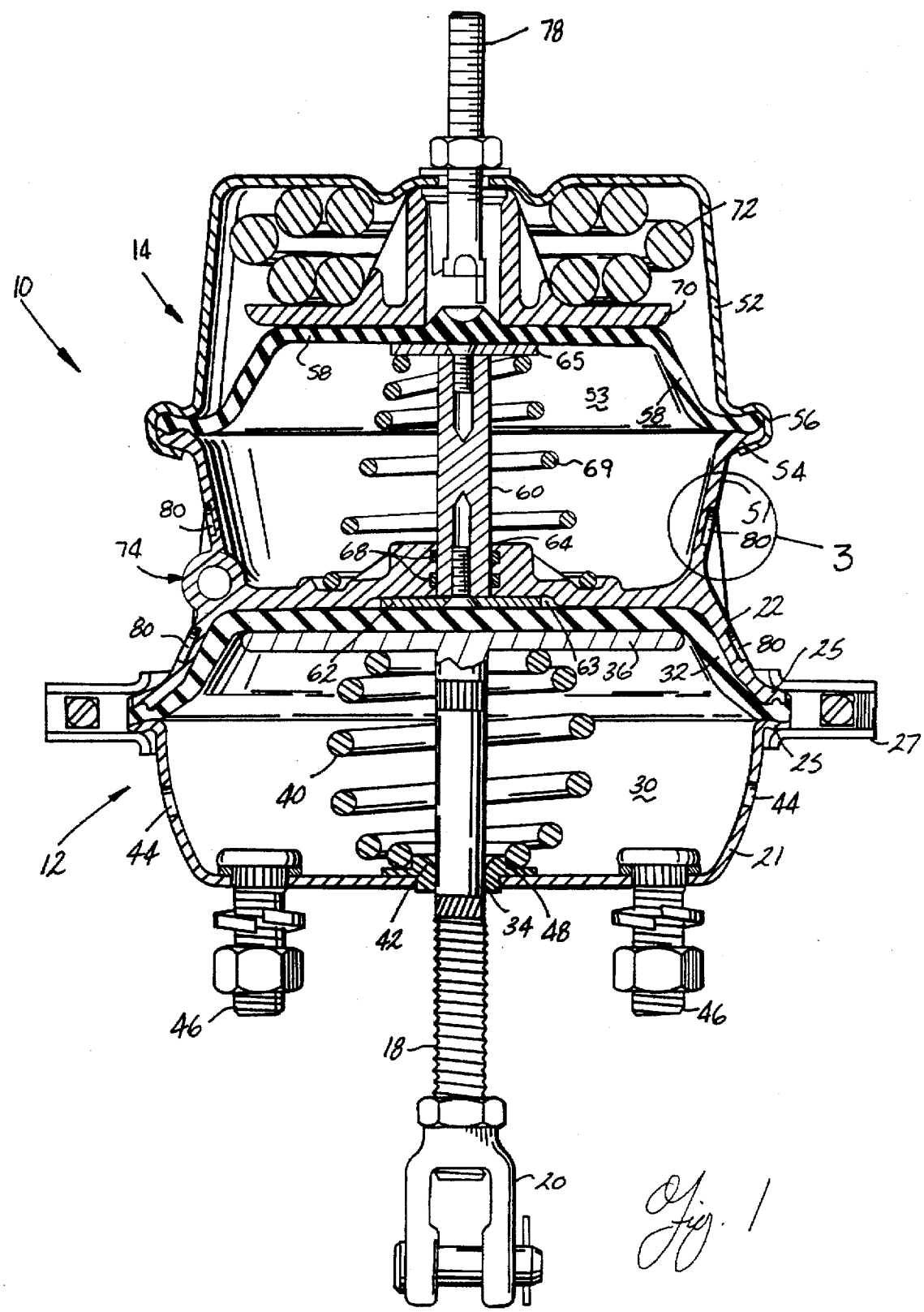
FIG. 1 is a cross-sectional view of an air-operated brake actuating assembly having corrosion fuses in accordance with the principles of this invention.

FIG. 1 shows a cross-sectional view of an air-operated brake actuating unit 10 having a general configuration well known in the art. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed ranged edge 25. The housing sections 21 and 22 are clamped together at their ranged edges by means of a clamp 27 to form a service brake inner chamber 30. An elastomeric diaphragm 32 is suspended within the inner chamber 30 and is compressed at the peripheral edge thereof between flanged edges 25 of the housing sections 21 and 22. The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 42 is disposed around the central opening 34 to receive the end of the compression spring 40 and retain it in position around the opening 34. The spring 40 thus urges the pressure plate 36 and the service brake push rod 18 to a fully retracted position as depicted in FIG. 1. To operate the service brake, compressed air is introduced through an air service port in housing section 22 (not shown in the drawing) to force the diaphragm 32 and pressure plate 36 against the force of spring 40 to actuate the push rod 18. Vent openings 44 are provided in the housing section 21 to allow for the rapid evacuation of air from the inner chamber 30. Mounting studs 46 are provided to mount the brake actuating unit 10 onto a brake assembly.

The spring brake 14 comprises a pair of facing cup-shaped housing sections 51 and 52 joined at their edges to form an inner chamber 53. Housing section 51 is provided with an outwardly directed circumferential flanged edge 54. The housing sections 51 and 52 are clamped together by means of a peripheral curved edge 56 on housing section 52 engaging edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms an air chamber which is filled with compressed air supplied through an air service port in housing section 51 (not shown in the drawing) when the emergency brake is in its normal released position. An actuator rod 60, aligned with push rod 18, has one end extending through a central opening 64 in an end wall of housing section 51. The one end of actuator rod 60 terminates in a reaction plate 62 disposed in an aligned central opening 63 in an end wall of housing section 22. Opening 64 is pneumatically sealed with a pair of O-ring seals 68. The other end of actuator rod 60 carries a spring chamber reaction plate 65 which bears against the diaphragm 58. A small force return spring 69 is positioned to bias the reaction plate 65 against the diaphragm 58. On the other side of the diaphragm is a pressure plate 70 which engages a spring brake compression spring 72. The pressure plate 70 is adapted to receive a caging bolt 78 by which the spring 72 can be mechanically retracted and caged.

During normal operation of the brake 10, the actuator rod 60 will be in the fully withdrawn position, as depicted in FIG. 1, by means of compressed air which is maintained in the portion of the chamber 53 defined by the diagram 58 and housing section 51. When the compressed air is exhausted, compression spring 72, one end of which engages the outer end wall of housing section 52, forces the pressure plate 70, the diaphragm, and thus, the rod 60 in the direction of the brake push rod 18 of the service brake 12. The housing section 22 of the service brake 12 and housing section 51 of the spring brake 14 may be steel shells attached to each other by means of a circumferentially extending weld bead (not shown) or other suitable attachment means. More typically, the housing sections 22, 51 are integral in an aluminum casting 74, sometimes called an "adapter" in that it adapts mounting the spring brake actuator 14 in tandem with the service brake actuator 12. The force of spring 72 urges the actuator rod 60 to extend through the central opening 64 and causes the reaction plate 62 to apply a force to the diaphragm 32 and pressure plate 36 of the service brake 12. This action urges the service brake push rod 18 to be extended, thereby actuating the brake to be applied. When the brake is to be released, compressed air is once again introduced in the space between housing section 51 and diaphragm 58. The force of the compressed air against diaphragm 58 causes pressure plate 70, rod 60 and spring 72 to be returned to the position depicted in FIG. 1, while simultaneously, the return spring 69 urges the rod 60 to the retracted position.

Figure 2:
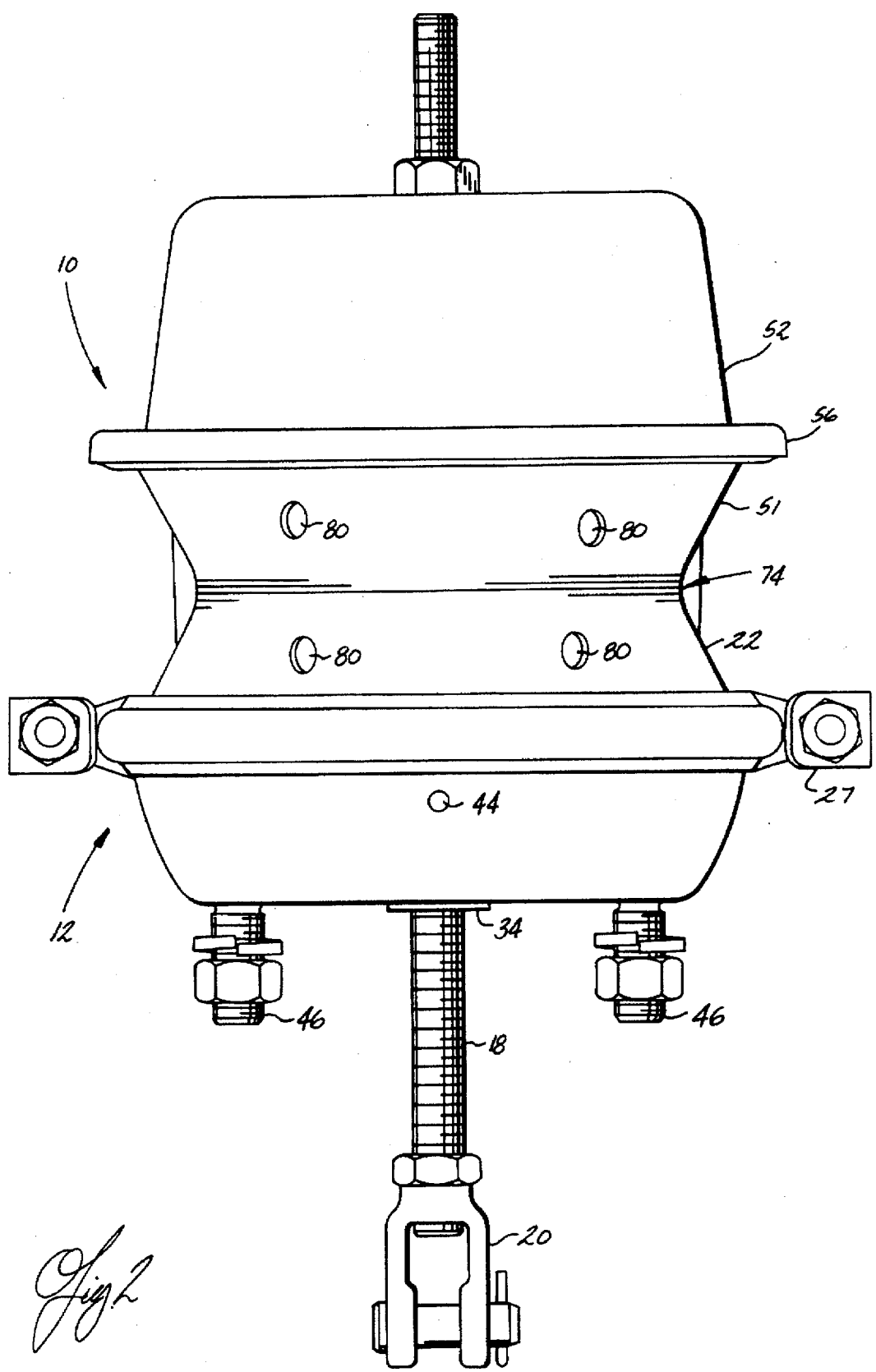
FIG. 2 is a plan view of the spring brake actuator arrangement of FIG. 1.

Referring now to FIGS. 1 and 2, the housing sections 22, 51 are provided with several recessed areas where the material from which the housing sections are formed is thinner than the surrounding areas. These thinned areas 80 are clearly defined, but constitute a small enough total area that they do not compromise the necessary structural support of the housing sections 22, 51. Any corrosion occurring on the surface of housing sections 22, 51 is likely to result in penetration of the wall portion in the thinned areas 80 before surrounding areas. Of course, when the wall is thus penetrated, a leak will occur which compromises, in particular, the ability of the chamber 53 to retain pressure. The resulting leak will interfere with the normal operation of the brake, but will not result in failure of the adapter 74 because the surrounding area of the adapter maintains the structural integrity of the housing sections 22, 51. Thus, each recessed area 80 acts as a "corrosion fuse" in the sense that it is a safety device, predefining a given area where corrosion failure is likely to occur without compromising the structural integrity of the adapter 74 or its housing sections 22, 51.

These thinned areas or corrosion fuses 80 can be dispersed evenly about the adapter 74 and may be formed in the original casting or stamping or otherwise formed by machining, for example. Depending on the size of the housing sections 22, 51, there will preferably be anywhere from two to ten corrosion fuses dispersed about the surface. The thinned areas forming each fuse 80 can be any shape, although most typically they are circular in plan view.

Figure 3:
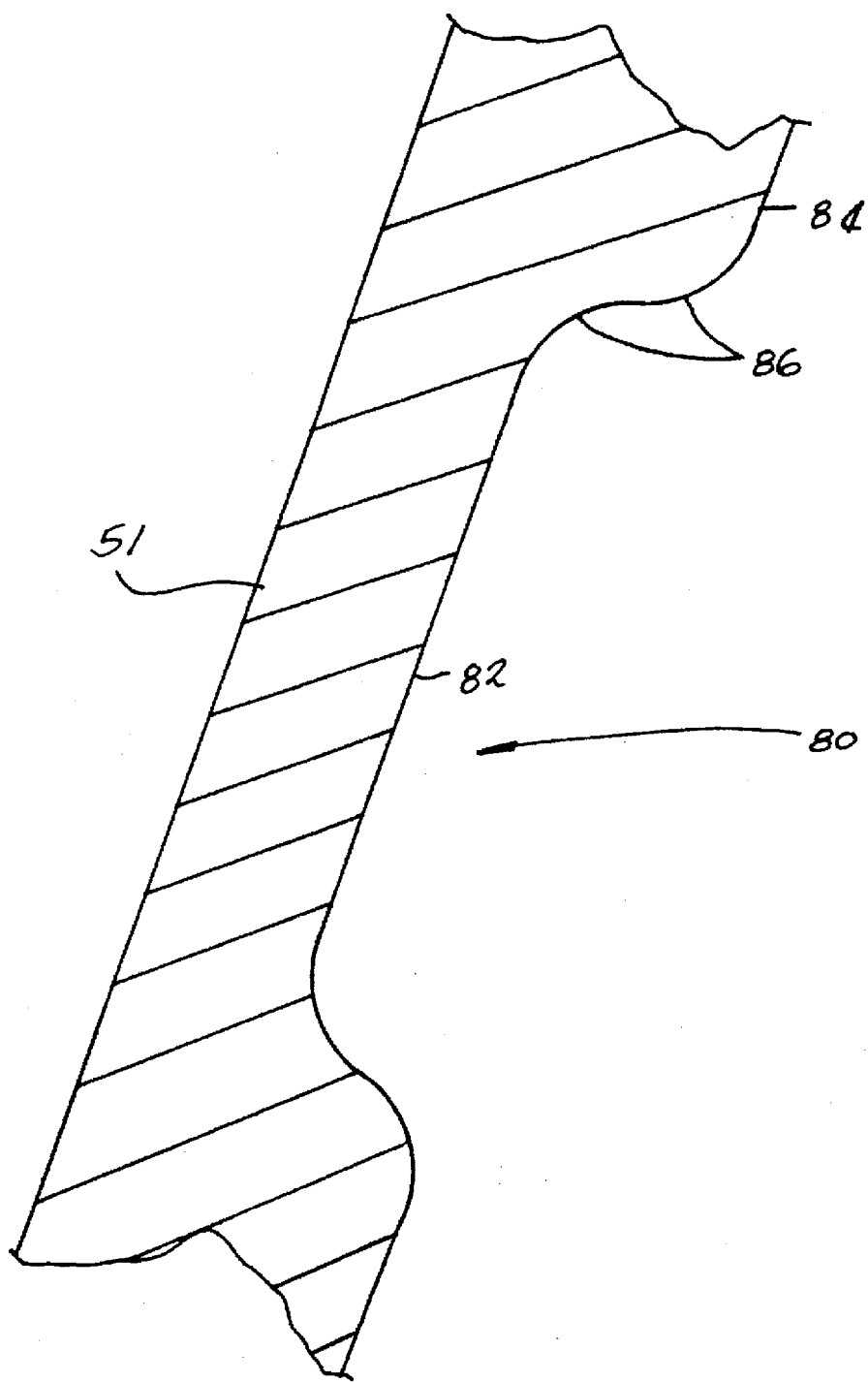
FIG. 3 is an enlarged view of the corrosion fuse enclosed by the circle 3 in FIG. 1.

Looking now at FIG. 3, it will be apparent that each thinned area 80 comprises a shallow depression 82 in one of the wall surfaces 84. Preferably, the depression 82 is on an exterior surface of the housing sections 22, 51, although it may also be on the interior surface, or both, with the same result. The edges 86 of the depression 82 are curved with radii, in order to avoid discontinuities in the surface and minimize stress risers.

Reasonable variations and modifications of the disclosed embodiments are possible without departing from the scope of the invention. For example, corrosion fuses are equally applicable to a steel adapter wherein the recessed areas may be stamped, pressed, or machined.

I claim:

1. In a brake actuator of the type having a housing with a wall formed of a material subject to corrosion, a pressure chamber within the housing, and a movable member within the housing movable in response to changes in normal pressure within the pressure chamber for actuation and release of a brake, the improvement comprising:

at least one corrosion fuse on the housing adjacent to the pressure chamber, said corrosion fuse comprising a portion of the wall wherein the wall is thinner than the surrounding area, and the thinner wall portion has a clearly defined area of a dimension insufficient to compromise the ability of the wall to support the housing so that any corrosion occurring on a surface of the wall is likely to result in penetration of the wall at the thinner wall portion before penetration of the surrounding areas of the wall.

2. A brake actuator according to claim 1 wherein the thinner wall portion is formed by a depression on an exterior surface of the wall.

3. A brake actuator according to claim 2 wherein the depression is formed with curved edges that avoid discontinuities in the exterior surface of the wall.

4. A brake actuator according to claim 3 wherein the depression is circular in shape.

5. A brake actuator according to claim 4 wherein the number of corrosion fuses is within the range of two to ten, inclusive.

6. A brake actuator according to claim 1 wherein the thinner wall portion is formed with curved edges that avoid discontinuities in the surface of the wall.

7. A brake actuator according to claim 1 wherein the thinner wall portion is circular in shape.

8. A brake actuator according to claim 1 wherein the number of corrosion fuses is within the range of two to ten, inclusive.

9. In a brake actuator for a vehicle comprising:

a service brake actuator and a spring brake actuator disposed in tandem and secured to each other by a metal adapter, said adapter having a wall adjacent to a chamber adapted to receive pressurized fluid for moving an actuator rod in one of the service and spring actuators, the improvement comprising:

a corrosion fuse on the adapter defined by a portion of the wall wherein the wall is thinner than at the surrounding area, and the thinner wall portion has a clearly defined area of a dimension insufficient to compromise the ability of the wall to contain pressurized fluid within the chamber so that any corrosion occurring on a surface of the wall is likely to result in penetration of the wall at the thinner wall portion before penetration of the surrounding areas of the wall.

10. A brake actuator according to claim 9 wherein the thinner wall portion is formed by a depression on an exterior surface of the wall.

11. A brake actuator according to claim 10 wherein the depression is formed with curved edges that avoid discontinuities in the exterior surface of the wall.

12. A brake actuator according to claim 11 wherein the depression is circular in shape.

13. A brake actuator according to claim 12 wherein the number of corrosion fuses is within the range of two to ten, inclusive.

14. A brake actuator according to claim 9 wherein the thinner wall portion is formed with curved edges that avoid discontinuities in the surface of the wall.

15. A brake actuator according to claim 9 wherein the thinner wall portion is circular in shape.

16. A brake actuator according to claim 9 wherein the number of corrosion fuses is within the range of two to ten, inclusive.

* * * * *